Figure 1:
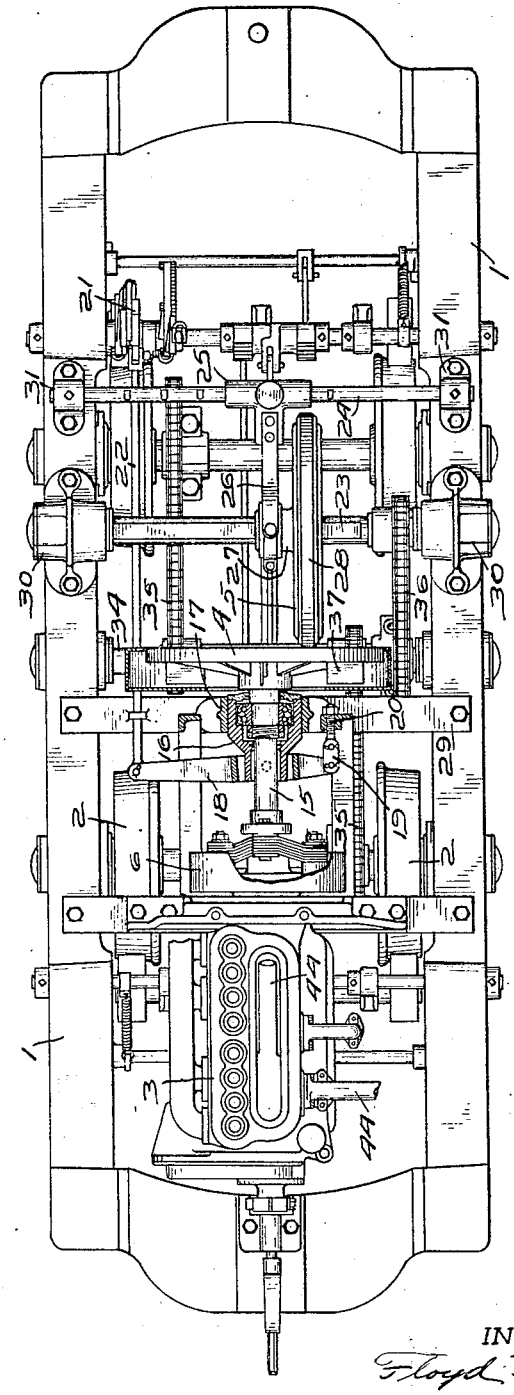

F. B. CARTER.
LOCOMOTIVE.
APPLICATION FILED DEC. 12, 1917.

1,283,665.

Patented Nov. 5, 1918.
2 SHEETS—SHEET 1.

INVENTOR
Floyd B. Carter
by
Owen, Owen & Crampton

F. B. CARTER.
LOCOMOTIVE.
APPLICATION FILED DEC. 12, 1917.
1,283,665.
Patented Nov. 5, 1918.
2 SHEETS—SHEET 2.
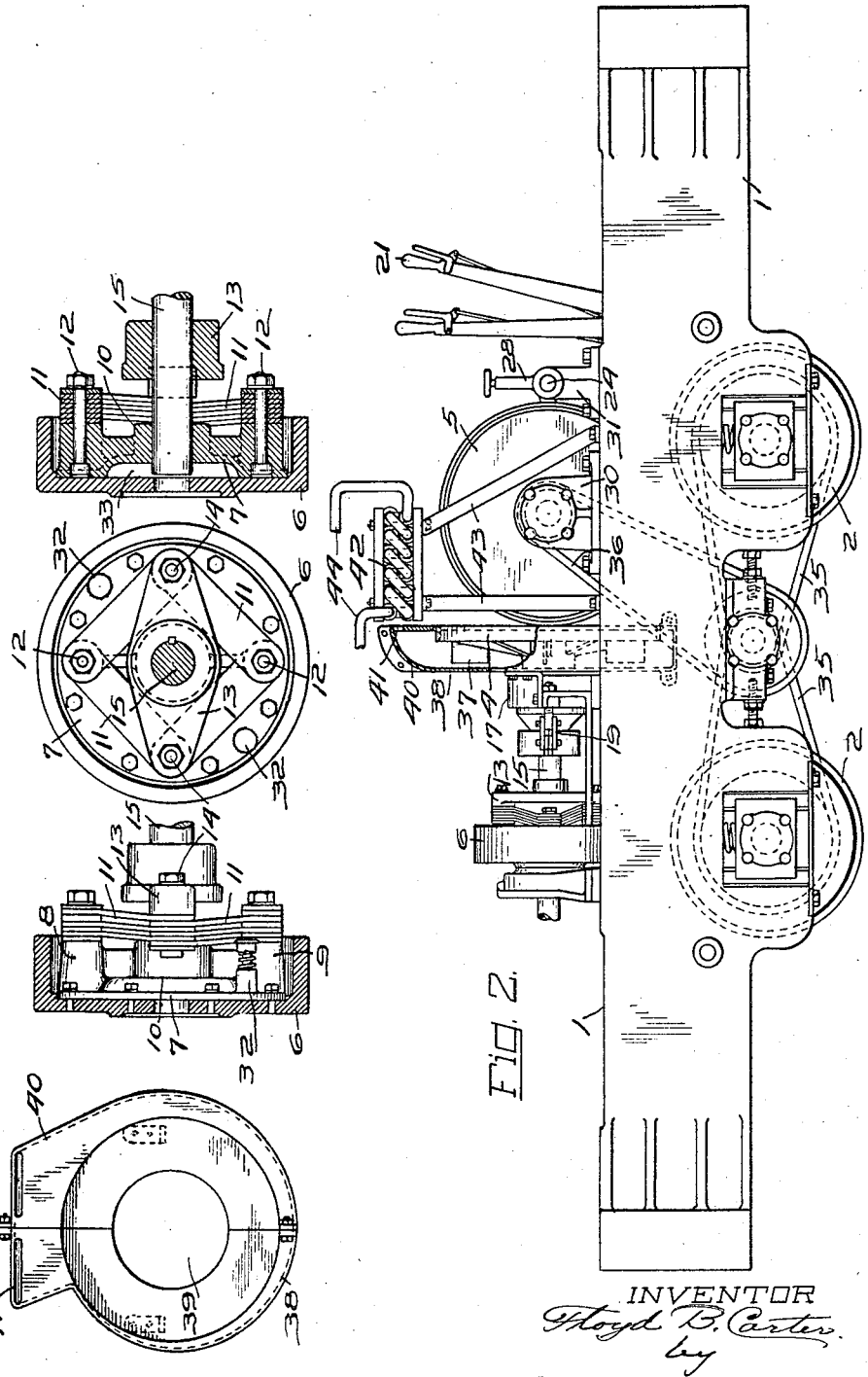
INVENTOR
Floyd B. Carter.
by
Owen, Owen & Crampton

UNITED STATES PATENT OFFICE.

FLOYD B. CARTER, OF PLYMOUTH, OHIO, ASSIGNOR TO THE J. D. FATE COMPANY, OF PLYMOUTH, OHIO, A CORPORATION OF OHIO.

LOCOMOTIVE.

1,283,665.   Specification of Letters Patent.   Patented Nov. 5, 1918.

Application filed December 12, 1917. Serial No. 206,762.

*To all whom it may concern:*

Be it known that I, FLOYD B. CARTER, a resident of Plymouth, in the county of Richland and State of Ohio, have invented a certain new and useful Locomotive; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to produce an internal combustion engine driven locomotive, having an efficient transmission intermediate the drive wheels of the locomotive and the internal combustion engine. The particular objects of my invention are first, to form an effective flexible connection intermediate a friction drive and the engine, and second, to locate an intermediate connecting drive shaft between the friction drive and the drive wheels of the locomotive so that the movement of the body of the locomotive relative to the drive wheels of the locomotive will not materially effect the sprocket chains that transmit the power from the friction drive to the locomotive drive wheels. The invention also has for its particular object to provide in conjunction with the friction drive an efficient cooling or radiating means for keeping the temperature of the cooling medium of the engine at a low point.

The invention may be contained in structures of different forms. I have selected for purposes of illustration a form of a locomotive that contains the invention and shall describe it hereinafter. The locomotive selected is illustrated in the accompanying drawings.

Figure 1 of the drawings is a top view of the locomotive, a part thereof being shown in section and a part thereof being shown broken away to more clearly illustrate certain details of construction. Fig. 2 is a side view of the locomotive, the engine not being shown in the figure. Fig. 3 illustrates a part of the cooling means for cooling the water of the engine. Fig. 4 is a sectional view of the fly-wheel of the engine and shows a side view of the flexible connector intermediate the friction drive and the engine. Fig. 5 is a side view of the connector illustrated in Fig. 4. Fig. 6 illustrates a sectional view through the connector to show the manner in which the shiftable shaft of the friction drive is lubricated.

1 is the frame of the locomotive, 2 are the drive wheels which are provided with the usual flanges for running on tracks. 3 is the engine and 4 and 5 are the friction drive wheels forming the transmission wheels for connecting the engine with the locomotive drive wheels 2.

The engine 3 is provided with the usual fly-wheel 6 in which is located a bossed plate 7 having the bosses 8 and 9 and the hub 10. The plate 7 is bolted to the fly-wheel 6 of the engine and a plurality of leather links 11 are secured by bolts 12 located in the bosses 8. The ends of the links 11 are secured to the ends of the cross head 12 by means of the bolts 14. The shaft 15 is securely connected to the cross head 13 by means of a suitable key. The shaft 15 extends into the hub 10 of the plate 7 and is slidably movable lengthwise of the shaft therein. The shaft is supported for rotary movements in ball bearings located in the collar or socket 16 which is slidably movable in the shell 17. The shaft 15 and the socket 16 are moved by means of the lever 18 which is connected by pins with the socket 16 and is fulcrumed on the end of the links 19 which are secured to the lever 18 and to the adjustable bolt 20. Movement of the lever 18 operates to shift the shaft 15, the end of the shaft 15 sliding in the hub 10. The shaft 15 is moved yieldingly against the elasticity of the links 11 either when moved toward the fly-wheel or when drawn away from the fly-wheel. The lever 18 is operated by means of a lever 21 to which it is connected by means of the rod 22. A friction disk 4 of gray iron is keyed to the shaft 15 and moves with the shaft both in its rotary movements and in its longitudinal movements. A friction drive wheel 5 is supported on a square shaft 23 whereby the wheel 5 is keyed to the shaft 23 and permits the wheel 5 to be shifted along the shaft 23. A rod 24 is located parallel to the shaft 23 and a sleeve 25 is slidably movable along the rod 24. The sleeve 25 is connected to an arm 26 in which the hub 27 of the wheel 5 rotates, the end of the arm 26 being provided with a suitable collar located between flanges formed on the hub 27. The sleeve 25 is provided with a handle 28 for shifting the sleeve 25. Movement of the sleeve 25 along the rod 24 also shifts the friction drive wheel 5 along the shaft 23 so as to place the drive wheel 5 in different positions along the diameter of the friction disk 4. The wheel 5 being located at right angles to the friction disk 4, its periphery may be engaged by movement of the friction disk 4 toward the wheel 5. This is accomplished when the lever 21 is pulled forward so as to swing the lever 18 toward the shaft 23.

The wheel 5 is provided with a suitable fibrous tire 28 which coacts with the gray iron of the disk 4 to efficiently transmit the power of the engine to the shaft 23, and yet will wear notwithstanding the friction which is produced by the difference in movements between the friction disk 4 and the wheel 5.

The shell 17 is supported on the frame 1 by means of a cross bar 29. The shaft 23 is supported in bearings 30 also located on the frame 1 and the rod 24 is keyed in brackets 31 also located on the frame 1.

The shaft 15 is elastically held by means of the links 11 in a position that will place the disk 4 very close to, but without pressure on, the tire 28 of the drive wheel 5 so that the longitudinal movements produced in the shaft 15 will be permitted, the links swinging inward and outward to allow the plate 4 to be moved to and from the periphery of the wheel 5, and yet the links will cause, by reason of their slight elasticity, return movements of the disk 4 until the links are in vertical planes. The links 11 thus provide an efficient connecting means between the engine and the positively longitudinally movable shaft.

The shaft 15 is lubricated for its shifting movements by grease that is inserted beneath the plate 7 through the grease cups 32, the interior of which communicate with the chamber 32 formed between the plate 7 and the fly-wheel 6.

The drive wheel 5 is connected through a sprocket wheel and chain to a shaft 34 located in adjustable bearings on the underside of the frame 1. The shaft 34 is located practically in the same plane with the axles of the locomotive drive wheels 2 which are supported in suitable axle boxes on which the frame 1 rests through suitable springs. The drive wheels 2 are connected with the shaft 34 by means of the chains 35, which receives its power from the friction drive wheel 5 through the chain 36. Inasmuch as the shafts 34 and 23 are secured to the frame 1 they will not move relative to each other. The axes of the shaft 34 and of the drive wheels being substantially in the same plane, movements of the shaft 34 will not cause any change in the distances between the axes of the shaft 34 and the drive wheels, consequently the drive chains 35 will not be effected by any movements of the shaft 34 relative to the wheels. If, on the other hand, the shaft 23 was connected by sprocket chains to the drive wheels 2, the distances between the shaft 23 and the wheels will vary which will cause alternate loosening and tightening of the sprocket chains. The same would be true if the shaft 34 were not located substantially in the plane of the drive wheels. This would cause great damage to the chains by reason of the jerking movements that would be produced in the use of the locomotive. The power being transmitted through the idler shaft 34 and thence to the drive wheels 2, there is no wear or tear produced by the movements of the frame 1 relative to the drive wheels 2.

The friction disk 4 is moreover provided with vanes 37 which are located on the back of, that is, on the side of the disk 4, away from the side on which the wheel 5 is located. The disk 4 is surrounded by a two part shell 38 having a large opening 39 located around the hub of the disk 4 and eccentric with respect to the larger diameter of the main portion of the shell. The shell 38 is provided with a conduit 40 extending upward to a point above the drive wheel 5. The upper end of the extension is provided with openings or slots 41. A radiator 42 is supported by suitable brackets 43 and so as to receive the air that will be forced by the vanes 37 through the shell 38 and out through the openings 41. The radiator 42 may be formed of pipes or water passageways located in two parallel layers between which the air from the blower that is thus formed by the disk and the shell 38 may be driven. The radiator 42 is connected by suitable pipes 44 with the jacket of the engine. The water from the engine will be kept at a low temperature and by the forced circulation of the air and the circulation of the water through the pipes 44 and the radiator 42.

I claim:

1. In a locomotive drive, an engine, a shaft, means for positively shifting the shaft lengthwise, links of elastic yielding material interconnecting the engine and the shaft.

2. In a locomotive drive, an engine, a shaft, means for holding the shaft in axial alinement with the shaft of the engine, means for positively shifting the second named shaft longitudinally, elastic links interconnecting the said shafts.

3. In a locomotive drive, an engine, a longitudinally movable shaft, a friction disk keyed to the shaft, a friction drive wheel, means for shifting the shaft and the friction disk to engage and disengage with the friction drive wheel, elastic links interconnecting the said shaft and the shaft of the engine.

4. In an internal combustion driven locomotive, an engine, a friction disk connected with the shaft of the engine, vanes located on the friction disk, a shell surrounding the friction disk and the vanes and forming a blower, a radiator located to receive the air from the blower.

In testimony whereof, I have hereunto signed my name to this specification.

FLOYD B. CARTER.

Copies of this patent may be obtained for five cents each, by addressing the "Commissioner of Patents, Washington, D. C."